April 23, 1957     A. H. BRUSH     2,789,456
EXPANSIBLE FASTENER HAVING A CROWN SPRING HEAD
Filed Dec. 14, 1954
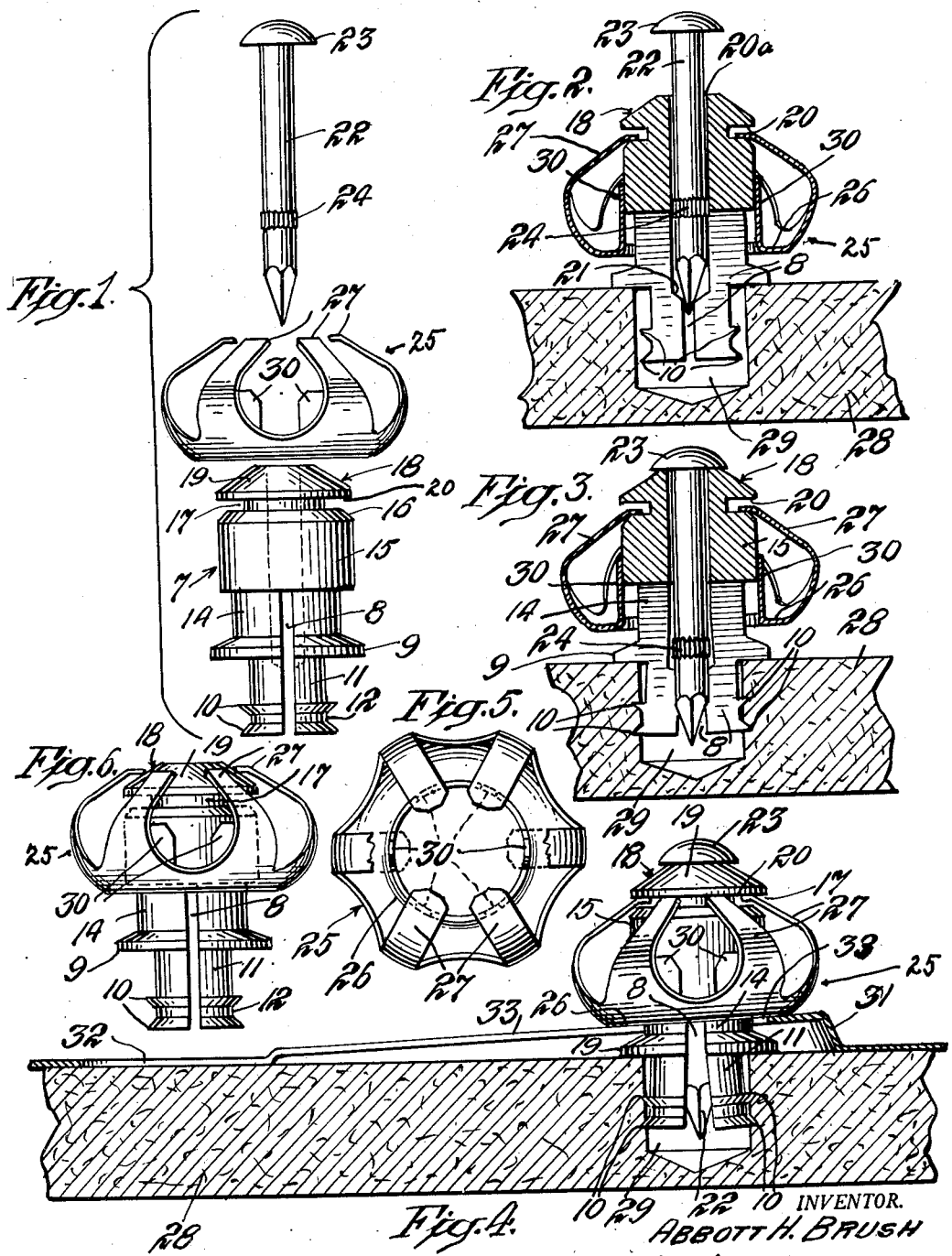
INVENTOR.
ABBOTT H. BRUSH
BY
Philip S. McBean
ATTORNEY

United States Patent Office 2,789,456
Patented Apr. 23, 1957

2,789,456
EXPANSIBLE FASTENER HAVING A CROWN SPRING HEAD

Abbott H. Brush, Greenwich, Conn.

Application December 14, 1954, Serial No. 475,189
1 Claim. (Cl. 85—2)

The invention herein disclosed relates to fasteners of the type known as sheet buttons used for mounting wall panels on wall studding.

As previously proposed and constructed, these fasteners have been made up of a number of parts and have required the use of a screw-driver or other such turning tool where a screw is used for expanding split inner end of the insert. Special care was required in such cases for turning the screw only far enough to fully expand the insert, without applying such force as to twist the insert and loosen it in its seat in the panel.

The present invention aims to overcome the foregoing and other disadvantages and to accomplish this with a simple, inexpensive, practical construction which can be properly set in the panel with a simple, hammer-driving operation.

Essentially the fastener of the present invention consists of but three simple parts: an insert or stud having a split expansible inner end portion and a nail opening in the outer end, a crown spring sleeved over the stud and a nail to be driven through the outer end of the stud into expanding engagement with the inner expansible split portion of the stud.

An object of the invention is to provide a simple combination such as stated, wherein the crown spring is of such nature that it can be assembled by a simple axial movement over the stud.

Another object of the invention is to provide an arrangement as above wherein incidental to such assembly the crown spring will be snap-latched in sufficient engagement with the stud to preclude accidental loss of the spring from the stud.

A further object of the invention is to so arrange the parts that this interlocking engagement will become the more positive the greater the force applied to the spring to shift it axially toward the outer end of the stud.

Still another object of the invention is to provide a fastener wherein the parts so coact that as the sheet button is brought into anchoring engagement with a wall stud there will be an accompanying compression of the spring which will act to interlock the spring the more firmly in engagement with the stud.

Other novel features of the invention and other desirable objects and results attained by the invention are set forth and will appear in the course of the following specification.

The drawing accompanying and forming part of the specification illustrates a present commercial embodiment of the invention. Structure, however, may be modified and changed within the intent and scope of the invention as hereinafter defined and claimed.

Fig. 1 in the drawing is a composite perspective view showing the three parts of the fastener in their uncombined relation;

Fig. 2 is a longitudinal sectional view showing the stud located in its seat in the back of a wall panel and the nail ready to be driven into the outer end of the stud, the wall panel appearing in broken section;

Fig. 3 is a similar view showing the nail driven into and interlocked in the stud and the inner end of the stud fully expanded and interlocked in the panel;

Fig. 4 is a broken sectional view showing the wall panel with attached fastener applied to a wall stud, the latter appearing in broken section;

Fig. 5 is a top plan, partially broken view of the crown spring; and

Fig. 6 is a side elevation showing the spring in course of being assembled on the stud.

In Fig. 1 the stud which is designated 7, is shown as split inwardly from the inner end at 8 and as flanged at 9 to provide a stop shoulder for engagement with the back of a wall panel.

The inner end of the stud is shown as having a pair of sharp annular fins 10 to bite into the material of the panel, and in order to increase the sharpness of the fins the stud inwardly of the stop shoulder 9 is of the reduced diameter shown at 11 and 12.

The stud outwardly of the flange 9 is shown as having a cylindrical portion 14 of larger diameter than the stud portions 11 and 12. Outwardly of said stud portion 14 the stud is shown as having a major portion 15 of largest diameter. This stud portion 15 terminates at its outer end in an annular bevel 16, outwardly of which in the direction of length of the stud is an annular groove 17.

The outer end of the stud is shown as formed as a frusto-conical head 18 to present a bevel 19 lying immediately outwardly of the groove 17, so that an annular shoulder 20 facing the inner end of the stud is between the head 18 and the outer end of the major cylindrical stud portion 15.

The outer end of the stud has a nail receiving opening designated 20a in Fig. 2, extending down into the split portion of the stud and terminating in inclined spreading shoulders 21.

The nail for spreading the stud is designated 22. This may, though not necessarily, have a head 23 for driving purposes and to provide a grip for an extracting tool, should it later be desired to withdraw the nail as for the purpose of removing the fastener from the panel.

Preferably, also, the expanding nail is made with a narrow band of mill-knurling or fluting 24 to hold the nail in the hole 20a in the stud. The nail may be the full length of the stud or even slightly or somewhat longer, in which latter event the point of the nail may penetrate the material of the panel to some extent to serve as a centering and reinforcing element for the stud.

The remaining element of the combination, the crown spring 25, is shown as comprising a basal annular portion 26 (Figs. 2 and 5) integral with which are a plurality of circumferentially arranged outwardly bowed fingers 27, which spring may be a steel stamping; the fingers 27 being so bowed and tensioned as to extend as shown in Fig. 6 before full assembly of the spring on the stud, and as in Figs. 2 and 3 following preliminary assembly of the spring on the stud.

The wall panel is indicated at 28, having a blind opening 29 in the back of the same of a size to form a seat for the split inner end of the stud. This seat may be large enough to freely admit the split inner end portion of the stud so that the stud may be mounted by simply locating it in the hole 29 and then driving in the nail with a hammer. Incidental to this driving of the nail, the pointed end thereof in being driven past the spreading shoulders 21 in the stud expands the split inner end of the stud for deep bite of the sharp fins 10 into the material of the panel to interlock the stud in the panel. At the time the nail is locked in the stud, the nail head 23 over the outer smaller end of the stud may project enough to enable an extracting tool to remove the nail and make possible removal of the fastener from the panel.

The crown spring 25 is shown as having a circumferentially arranged plurality of lesser fingers 30, Figs. 1, 2 and 5. As herein shown, there are six of these lesser fingers, just as there are six of the larger, outwardly bowed fingers 27. As indicated best in Fig. 5, each of the lesser fingers 30 is inwardly offset from and radially in line with one of the larger bowed fingers 27. Said lesser fingers 30 are shown as parallel with each other and hence parallel with the axis of the stud 5 when the parts are arranged as in Figs. 2 through 6.

The said fingers 30 are shown as arranged and placed so as to act as a cage surrounding and having sliding fit on the cylindrical portion 15 of greatest diameter.

Fig. 4 shows how the panel may be applied to the wall stud 31 by passing the projecting head and spring portions of the panel stud through the larger end 32 of the usual keyhole opening in the stud 31 and then sliding the panel to carry the stud into the narrower portion 33 of the opening, with the basal annulus 26 of the spring sliding along over the back of the wall stud 31 as a yielding abutment. The elastic yield of the larger fingers 27 of the spring and a like yieldability of the lesser fingers 30 enables the spring, as shown in Fig. 4, to adjust itself to the back of the wall stud in this panel mounting operation. The spring may then rock one way or another, as necessary, to closely fit and frictionally engage the inclined or possibly irregular back surface of the wall stud.

While the mounting stud is shown split in one direction to form two relatively expansible portions, it will be understood that the stud may be split two ways to form four relatively expansible segments, or in fact, split in any number of ways as may seem best for different requirements. Other such changes may be made without departure from the true spirit of the invention. The drawing may be interpreted, indeed, as illustrating the mounting stud split in two ways to form four relatively expansible segments, if the stud as shown sectionally in Fig. 2 be considered taken on a plane at right angles to the plane on which the sectional view of Fig. 3 is taken.

The stud and spring may be readily combined simply by arranging the spring and stud as shown in Fig. 6 and then forcing the spring downward to allow the bevel 19 on the head 18 to cause enough spread of the free ends of the fingers 27 to enable said ends to drop below said head and snap into the groove 17. As the mounting stud is passed along the slot of the wall stud from the larger end of said slot, the basal annulus 26 of the spring is forced upward toward the outer end of the mounting stud and the main outwardly bowed spring fingers 27 are sprung even more outwardly and the free ends of said fingers are forced more deeply than before into the groove 17.

The flange 9 of the stud 5, shown as of even greater diameter than the major cylindrical portion 15 of the stud, provides an extended shoulder for engaging the back of the panel. The stud is shown as having a neck portion 14 larger in diameter than the portion of the stud lying immediately outwardly of the annular fins 10. This larger diameter portion 14 minimizes side play in the slot in the wall stud. The outer shoulder of the portion 15 prevents the spring from being forced too far down on the stud. The free ends of the fingers 27 are well separated, and the groove 17 is quite deep, as shown; this prevents too severe spring action and undesirable stress on the spring. The auxiliary or lesser centering fingers 30 assist proper spring action of the fingers 27.

The fluting 24 on the nail 22 is so positioned that when the mounting stud is assembled as in Fig. 2, said fluting is down far enough on the nail to be located as illustrated so that the first hammer blow will start spreading the slotted segments and so that the fluting will lose contact with the wall of the hole 20a and therefore offer no further resistance to driving of the nail.

The sheet button described can be produced at low cost, and it can be set in the wall panel quickly and easily and at a saving in time over previous fasteners of this type.

The nail may be allowed to penetrate the material of the panel if such material is soft or compressible enough so as not to crack or show any deformation or indication on the face of the panel.

It is to be understood that the largest portion 15 is of greater diameter than the width of the slot in the wall stud and will therefore act as a safety stop by engagement with the stud to prevent over-compression and breakage of the crown spring. If a spring should break, this shoulder will form an abutment engageable with the wall stud to hold the supported wall panel in place.

While in the several views the inner fingers 30 have been shown in line with the bowed outer fingers 27, it will be appreciated that this is not necessarily the case and that the inner and outer fingers may be staggered or arranged in alternate or other relation.

What is claimed is:

A sheet button comprising a stud having a split expansible inner end for anchorage in the back of a wall panel and having a nail receiving opening in the outer end extended into the split end portion of the stud, a nail of a size to be driven in through said nail opening into expanding engagement with the inner split end portion of the stud, and a crown spring sleeved over the stud and having at its outer end the free end portions of a plurality of circumferentially arranged outwardly bowed fingers, said spring at its inner end having a central opening surrounded by an annular portion integrally carrying all of said fingers, the stud having a stop shoulder for engagement with the back of a wall panel, and the portion of the stud outwardly from said shoulder being of a diameter such that the spring may be assembled on the stud merely by slip-down of the spring axially of the stud over the last-named stud portion, the stud near its outer end having an annular bevel with its larger diameter nearer the inner end of the stud, said spring being tensioned so that during said slip-down of the spring the said free end portions of said fingers will be elastically expanded during passage of the spring over said bevel for snapping of said finger end portions between said bevel and the inner end of the stud, the stud being annularly incut to provide immediately inwardly of said bevel an annular shoulder facing the inner end of the stud thereby to provide an annular recess for trapping said free end portions of said fingers incidental to compression of the spring in the direction of length of the stud, the parts being so proportioned that on mounting the sheet button on a wall stud the spring will be compressed as last described, said spring having a plurality of integral circumferentially arranged lesser fingers, these substantially parallel with each other and with the axis of the stud, the stud inwardly of said recess having a cylindrical portion to lie within said lesser fingers and of a diameter to have a sliding fit with said lesser fingers and a reduced neck portion inwardly of said cylindrical portion with a shoulder between said two portions, the annular portion of the spring in the normal position on the stud being disposed about said reduced neck portion and said lesser fingers extending over said shoulder between the reduced neck portion and cylindrical portion into loose sliding engagement with the cylindrical portion thereby to loosely guide the crown spring in rocking engagement on the stud.

References Cited in the file of this patent

UNITED STATES PATENTS

| | | |
|---|---|---|
| 998,781 | Kobert | July 25, 1911 |
| 1,453,471 | La Tarte | May 1, 1923 |
| 1,476,836 | Pleister | Dec. 11, 1923 |
| 1,540,508 | White | June 2, 1925 |
| 1,958,120 | Tuxbury et al. | May 8, 1934 |
| 2,033,100 | Kellogg | Mar. 3, 1936 |
| 2,350,315 | Kral | May 30, 1944 |

FOREIGN PATENTS

| | | |
|---|---|---|
| 18,353 | Great Britain | Sept. 1, 1908 |